(12) United States Patent
Kaprielian

(10) Patent No.: US 7,243,459 B2
(45) Date of Patent: Jul. 17, 2007

(54) METHOD OF CULTIVATION AND COMPONENTS FOR USE THEREWITH

(75) Inventor: Craig L. Kaprielian, Reedley, CA (US)

(73) Assignee: FW Enviro, LLC, Reedley, CA (US)

(*) Notice: Subject to any disclaimer, the term of this patent is extended or adjusted under 35 U.S.C. 154(b) by 34 days.

(21) Appl. No.: 11/016,796

(22) Filed: Dec. 20, 2004

(65) Prior Publication Data

US 2006/0150492 A1 Jul. 13, 2006

(51) Int. Cl.
*A01G 17/00* (2006.01)

(52) U.S. Cl. .................................. 47/1.01 R
(58) Field of Classification Search ............. 47/20.1, 47/21.1, 23.1, 24.1, 29.5, 44, 46, 47
See application file for complete search history.

(56) References Cited

U.S. PATENT DOCUMENTS

| | | | |
|---|---|---|---|
| 560,966 A | 5/1896 | Brown | |
| 727,541 A | 5/1903 | Hayes | |
| 762,014 A | 6/1904 | Wittbold | |
| 1,106,624 A | 8/1914 | Cadwallader | |
| 2,193,425 A * | 3/1940 | Lake | 47/33 |
| 2,974,442 A | 3/1961 | Womelsdorf | |
| 3,053,011 A | 9/1962 | Silverman | |
| 3,140,563 A | 7/1964 | Allen | |
| 3,526,993 A | 9/1970 | Siebol | |
| 3,581,436 A | 6/1971 | Besiger | |
| 3,738,060 A | 6/1973 | Jullien-Davin | |
| 3,932,958 A | 1/1976 | Kistler, Jr. et al. | |
| 3,991,939 A * | 11/1976 | Maclay | 239/63 |
| 4,015,366 A * | 4/1977 | Hall, III | 47/1.43 |
| 4,040,436 A | 8/1977 | Caldwell | |
| 4,068,404 A | 1/1978 | Sheldon | |
| 4,148,155 A | 4/1979 | Allen | |
| 4,177,604 A | 12/1979 | Friesen | |
| 4,237,653 A * | 12/1980 | Cortez | 47/73 |
| 4,248,013 A | 2/1981 | Allen | |
| 4,442,628 A | 4/1984 | Whitcomb | |
| 4,467,561 A | 8/1984 | Tsuchiya | |
| 4,497,132 A | 2/1985 | Whitcomb | |
| 4,614,055 A | 9/1986 | Day | |
| 4,888,914 A | 12/1989 | Reiger | |
| 4,901,472 A | 2/1990 | Donohue et al. | |
| 4,922,652 A | 5/1990 | Graves | |

(Continued)

FOREIGN PATENT DOCUMENTS

JP 406141704 A * 5/1994 ............ 47/44

OTHER PUBLICATIONS

Burnham, T.J., "Planting Pluses", California Farmer, Nov. 2002, pp. 12-13 and 16.

(Continued)

*Primary Examiner*—Francis T. Palo
(74) *Attorney, Agent, or Firm*—Jondle & Associates, P.C.

(57) ABSTRACT

A method and components for cultivation of plant materials. The components include enhanced berms, a confined irrigation/fertigation system, field and plant sensors, a plant support system, overcovering structure and a protective collar. Each of these components used singularly or in combination with each other enhances the growth and yield of plant material decreases the associated costs of cultivation, and decreases adverse environmental impacts.

31 Claims, 6 Drawing Sheets

U.S. PATENT DOCUMENTS

| | | | |
|---|---|---|---|
| 5,007,135 | A | 4/1991 | Rigsby |
| 5,035,078 | A | 7/1991 | Kipnees et al. |
| 5,167,092 | A | 12/1992 | Reiger |
| 5,337,514 | A * | 8/1994 | Hiyama et al. ............... 47/44 |
| 5,347,750 | A | 9/1994 | Mills |
| 5,411,561 | A * | 5/1995 | Conley .................. 47/58.1 R |
| 5,689,906 | A * | 11/1997 | Dillman et al. ............. 37/418 |
| 5,711,109 | A | 1/1998 | Pitts |
| 5,797,214 | A | 8/1998 | Parrish et al. |
| 5,832,896 | A | 11/1998 | Phipps |
| 5,956,923 | A * | 9/1999 | Andros et al. ............... 53/397 |
| 5,983,565 | A | 11/1999 | Chu |
| 6,023,883 | A | 2/2000 | Bacon, Jr. |
| 6,282,835 | B1 | 9/2001 | Richtsmeier |
| 6,357,172 | B1 | 3/2002 | Risgaard et al. |
| 6,421,954 | B2 | 7/2002 | Ko |
| 6,546,943 | B2 | 4/2003 | Lin |
| 6,601,527 | B2 * | 8/2003 | Gow et al. ................ 111/100 |
| 6,749,848 | B2 | 6/2004 | Chen |
| 6,865,845 | B2 * | 3/2005 | Fraleigh ................ 47/58.1 SE |
| 6,928,772 | B2 | 8/2005 | Bai et al. |
| 6,947,810 | B2 * | 9/2005 | Skinner ..................... 700/283 |
| 2001/0035204 | A1 | 11/2001 | Lin |
| 2002/0148158 | A1 | 10/2002 | Anderson |
| 2002/0170229 | A1 * | 11/2002 | Ton et al. ..................... 47/1.7 |
| 2003/0097788 | A1 | 5/2003 | Pierce, Jr. |
| 2004/0093792 | A1 * | 5/2004 | Avery ............................ 47/47 |
| 2005/0229827 | A1 * | 10/2005 | McKnight .................. 111/100 |

OTHER PUBLICATIONS

Matheron, Michael et al., "Effect of Temperature and Moisture on Survival of Phytophthora in Citrus Grove Soil", az1178:2000 Citrus and Deciduous Fruit and Nut Research Report, College of Agriculture and Life Sciences, the University of Arizona, Tucson, Arizona, 85721, May 1999.

www.tubex.com, Apr. 29, 2004.

* cited by examiner

METHOD OF CULTIVATION AND COMPONENTS FOR USE THEREWITH

BACKGROUND OF THE INVENTION

1. Field of the Invention

The invention relates generally to a method and components for cultivation, and more specifically to a method and components for increasing plant yields while decreasing the associated costs of time, labor growing space, fertilizer, fumigation, water, etc., and also decreasing the associated environmental impact.

2. Description of the Prior Art

The commercial production of plants and plant material for consumption is plagued with many difficulties associated with natural botanical characteristics and the environment in which the plants are grown. Proper horticultural practices to minimize these difficulties and maximize plant growth and production are necessary to ensure commercially viable production.

Commercial farms have evolved to grow plants in organized rows. The rows help facilitate the planting, feeding, trimming, feeding, watering, maintenance and harvesting of the plants or food products grown by the plants. Conventional growing practices often utilize flood-type irrigation techniques and mass spraying of chemicals used to fumigate and fertilize.

Flood irrigation and mass spraying, besides being wasteful of water and chemical resources, has the potential to damage surface soils and both ground water and surface water sources. Irrigating floodwater applied to fields promotes erosion and promotes run-off of fertilizers and pesticides into water sources. In arid environments flood irrigation often leads to soil mineralization associated with the buildup of surface salts. Flood irrigation also creates large swings over time in the amount of moisture in the soil, which stresses the plants.

Typical agricultural berms that have previously been in use do not reach a height greater than about 12 inches and a width at the base of about 2½ feet. Typical berms are used to slightly raise the plants to protect them from direct and damaging contact with water from flood irrigation. While these berms protect the plants from flood irrigation, these berms do not provide a sufficient soil zone for the roots of the plant (especially trees, bushes, vines and other plants with deep developing roots) to develop above a level where harmful nematodes occur.

Agricultural fields, especially those in continuous use, year after year, are usually infested with harmful nematodes that attack the roots of plants that are planted. Development of nematode resistant plant varieties and crop rotation have lessened the problem of nematode infestation to a limited extent. A field is typically fumigated before planting with a substance such as methyl bromide in an effort to kill the nematodes, but this also has achieved limited success since the harmful nematodes reside approximately 12 inches below the surface of the soil. The use of methyl bromide is also being severely restricted or banned completely in some regions due to adverse environmental effects associated with its use. Methyl bromide and other fumigants also kill many of the organisms in the soil that are beneficial to plants.

Furthermore, in traditional flood irrigation a significant percentage of water applied to a field is lost either through evaporation to the air or migration below the effective root zone of the plants. This technique wastes water resources, as does more advanced sprinkler techniques, although to a lesser extent.

In the fruit tree cultivation industry it is not uncommon to paint the trunks of matures trees white in order to prevent the tree from becoming "sunburned". Overheating of trees has long been recognized as a problem, but providing newly transplanted trees with protection from the sun has generally been ignored.

Young trees and vines transplanted from a nursery to a field are typically provided with some sort of conventional covering such as a wrap, tube or collar. The conventional wisdom in the industry is that these devices provide winter protection from the cold and a physical barrier to plant predators, pests, and herbicides as well as environmental factors such as windburn or frost damage. In order to achieve the desired winter warming advantage, conventional coverings are provided in direct contact with the plant, and the upper surface of the soil.

For example, when a young citrus tree is transplanted from a nursery to a field, at about 2-4 feet in height and ¼ to ½ inch in trunk diameter, a protective collar is placed around the trunk. Trees are typically transplanted in the spring, and the conventional collars may remain around the young plants for several years. However, these coverings have adverse affects during summer that are detrimental to the development of the plants. The covering increases the internal temperature within the coverings by as much as 20° F. which stresses the plant. Tubes and collars used for this purpose are slightly driven into the ground to provide a "mini-greenhouse" effect within the covering. In an effort to prevent plants from getting too cold in the winter the covering remedy has actually created an undue heat stress on the plants in the summer, either severely reducing plant growth or possibly killing the plant.

BRIEF SUMMARY OF THE INVENTION

The present invention utilizes a number of techniques and components to enhance plant production. The method of cultivation utilizes, in various possible combinations depending on the plant material, enhanced berms, confined irrigation and fertigation, field sensors above and below ground and on the plants, protective collars, plant supporting structures, and plant overcovering structures to increase plant yields. A further benefit of the use of these components and related methods is the decreased use of space, time to harvest, use of water, use of fertilizers, use of pesticides, labor and loss of plants to inclimate weather. The methods and components also substantially reduce adverse environmental impacts.

BRIEF DESCRIPTION OF THE DRAWING FIGURES

DETAILED DESCRIPTION OF THE PREFERRED EMBODIMENTS

Figure 1:
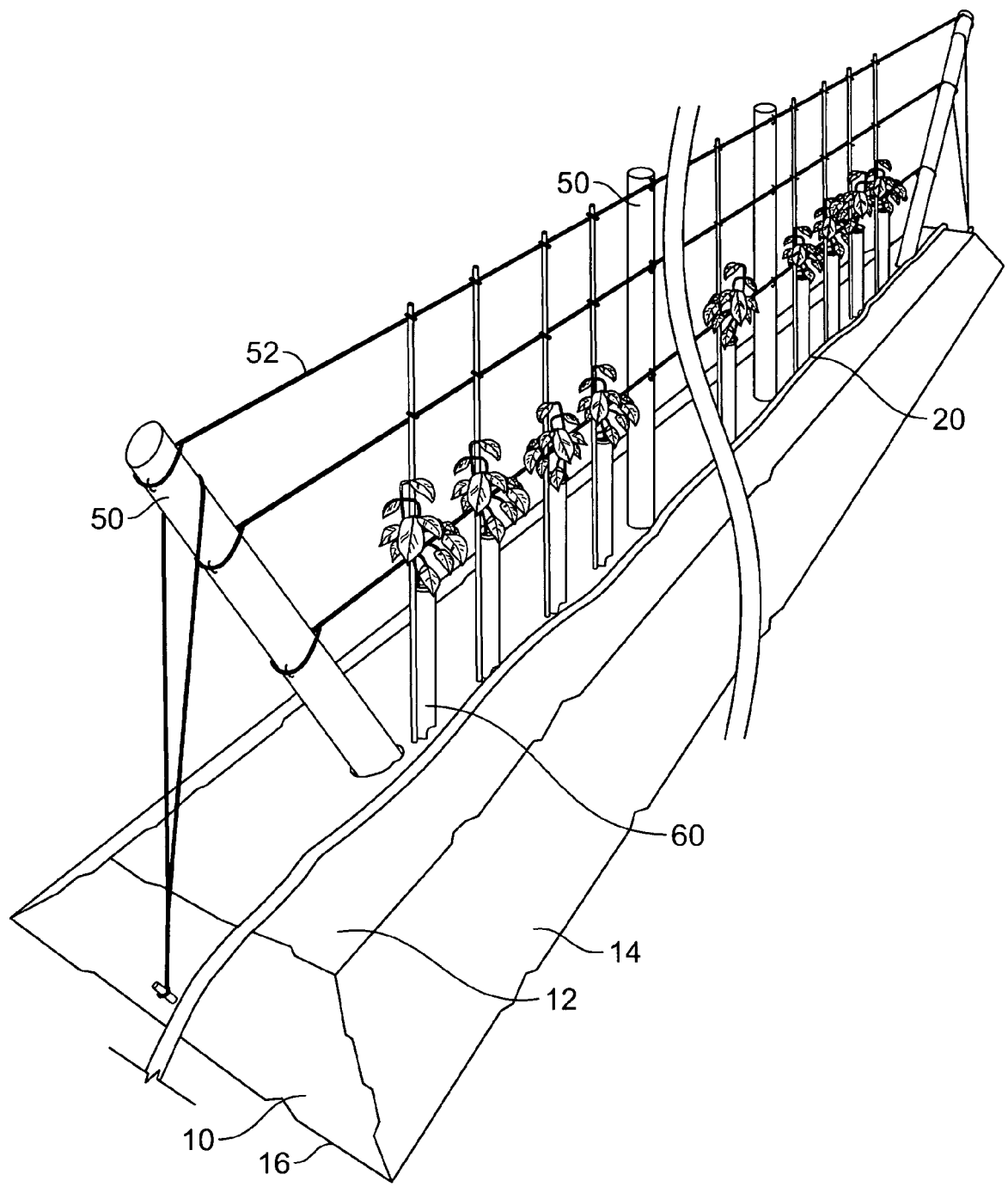
FIG. 1 is a perspective view of a row of young fruit trees grown in accordance with the present invention.

As shown in the drawing figures, a component of the present invention is an enhanced berm 10, which provides a sufficiently deep soil zone in which the roots of a plant are planted. The berm 10 provides a suitable volume of topsoil in which the feeder root system of the plant to develop.

It was discovered that the enhanced berm 10 provided a volume of soil which allowed the plant to develop above the level where harmful nematodes occur, and also provided additional benefits not previously realized by the smaller typical berms used in flood-type irrigation.

For level ground, the approximately top 12 (twelve) inches of soil is devoid of harmful nematodes due to the solar heating of that upper region of the soil that creates an environment adverse to the harmful nematodes. The enhanced berm 10 has a large surface area that readily absorbs solar energy, which warms the entire berm 10. The entire soil volume of berm 10 is thus maintained at an elevated temperature that is inhospitable to harmful nematodes. Thus, the entire soil volume of the berm 10 is available for root development, essentially free from harmful nematodes, whereas previously only the upper soil layer was available for root development absent the harmful nematodes.

The berm 10 is developed to a height that is adequate to provide room for root development of the intended plant. Any plant material may benefit from the enhanced berm 10. However, the berm 10 is most beneficial to plants that develop deep roots, such as trees, bushes, shrubs and vines.

Although the berm 10 may be developed in the typical rounded-top shape, it is preferred that the berm 10 be developed with a substantially flat top 12 to take better advantage of the confined irrigation and fertigation component of this cultivation method described later in further detail. The flat top 12 also provides a larger horizontal zone for root development.

As shown in the figures, the preferred embodiment of the berm 10 has the flat top 12, sloping sides 14 and a base 16 so that the berm 10 has a cross-sectional profile of a trapezoid. Preferably the top 12 of the berm is about half the width of the base 16, with the sides having a height about a third the width of the base. More preferably, the base 16 is approximately 6 feet wide, the top 12 is approximately 3 feet wide, and the sides 14 are 2 feet in height.

While a higher berm would provide for more room for root development above the level of the harmful nematodes, this creates additional problems. In order for the berms to be structurally stable the angle of the side slopes should not be too great. Steep-sided berms are more likely to experience structural failure due to slumping during irrigation, and erosion during periods of rainfall. In order to increase the height of a berm it is thus also necessary to increase the width of the berm base. However, in doing so, this would require an increase in the spacing between rows of plants to allow adequate room to drive farm vehicles to support growing and harvesting operations, which of course leads to a reduced number of rows and numbers of plants grown on a given size farm.

Berms taller than 2 feet also lead to other problems associated with growing, maintenance, and harvesting. As the width of the berm increases to accommodate the increase in height, the driving surface on either side of the berm becomes further away from the center of the plant. This makes it increasingly more difficult to work on plant maintenance and harvesting. Machines and ladders would need to be placed further away from the plant and reach farther to conduct the necessary operations on the plant. Working from the sides or tops of the berms is also not recommended since this leads to damage of the berms.

The berms 10 are preferably orientated in a direction to maximize the amount of sunlight provided to the berms and the plants being cultivated thereon.

Although the original purpose for the enhanced berm structure was for dealing with harmful soil organisms, many additional benefits have been realized when used in conjunction with the other components of the present invention. The enhanced berm has proved very successful in allowing plants to be grown without the need to kill harmful nematodes by fumigation in advance of planting. One of the undesirable side effects of fumigation is that the application of organism killing chemicals also kills beneficial soil organisms such as fungus, bacteria and some beneficial species of nematodes.

The enhanced berms also provide an increased surface area which in turn promotes better solar heating which promotes an extended and improved growing season. For example with citrus trees, new growth associated with flushing typically begins in mid February. The warmer soil temperature in the berm promotes higher levels of new growth at this time of the year. By early March this new growth starts putting out flowers, which also favors the warmer soil temperatures. The overall effect is that the warmer, drier soils of the enhanced berms produce a better flush, which in turn leads to better flowering and eventual fruit production.

Since there is an increased surface area, the enhanced berm soil also tends to stay drier. This leads to more efficient oxygenation of the soil, and increased oxygen transfer to the roots of the plants, enhancing plant growth throughout the year.

Warmer and drier soils in the spring also lead to enhanced fruit quality, especially in citrus. Warmer drier soils promote citrus fruit with increased sugar levels and decreased acids, which together result in improved quality fruit.

As previously mentioned, and will be discussed further, the enhanced berms allow also for a more efficient application of water and nutrients to the root zone within the berm. With a confined irrigation system, such as a drip or microspray irrigation system, the water and nutrients contained therein may be supplied to the top of the berm in shallow, controlled applications. These more frequent and shorter irrigation runs keep feeder roots shallow and relatively close to the trunk of the plant. Most feeder roots will subsequently occur in a zone within the top 12-18 inches of the berm top. While anchor roots may extend well below the base of the berm, they are not affected by harmful nematodes. The feeder roots will be confined to the warmer, better aerated, irrigated and fertilized soil zone.

The additional benefits of the development of shallower and confined feeder root systems will become more apparent in later discussions of the present invention. Cultivation using the typical smaller berms and flood irrigation results in unconfined and expanded feeder root development which is susceptible to nematode infestation and does not enjoy the many benefits that result from the methods and components of the present invention.

Figure 3:
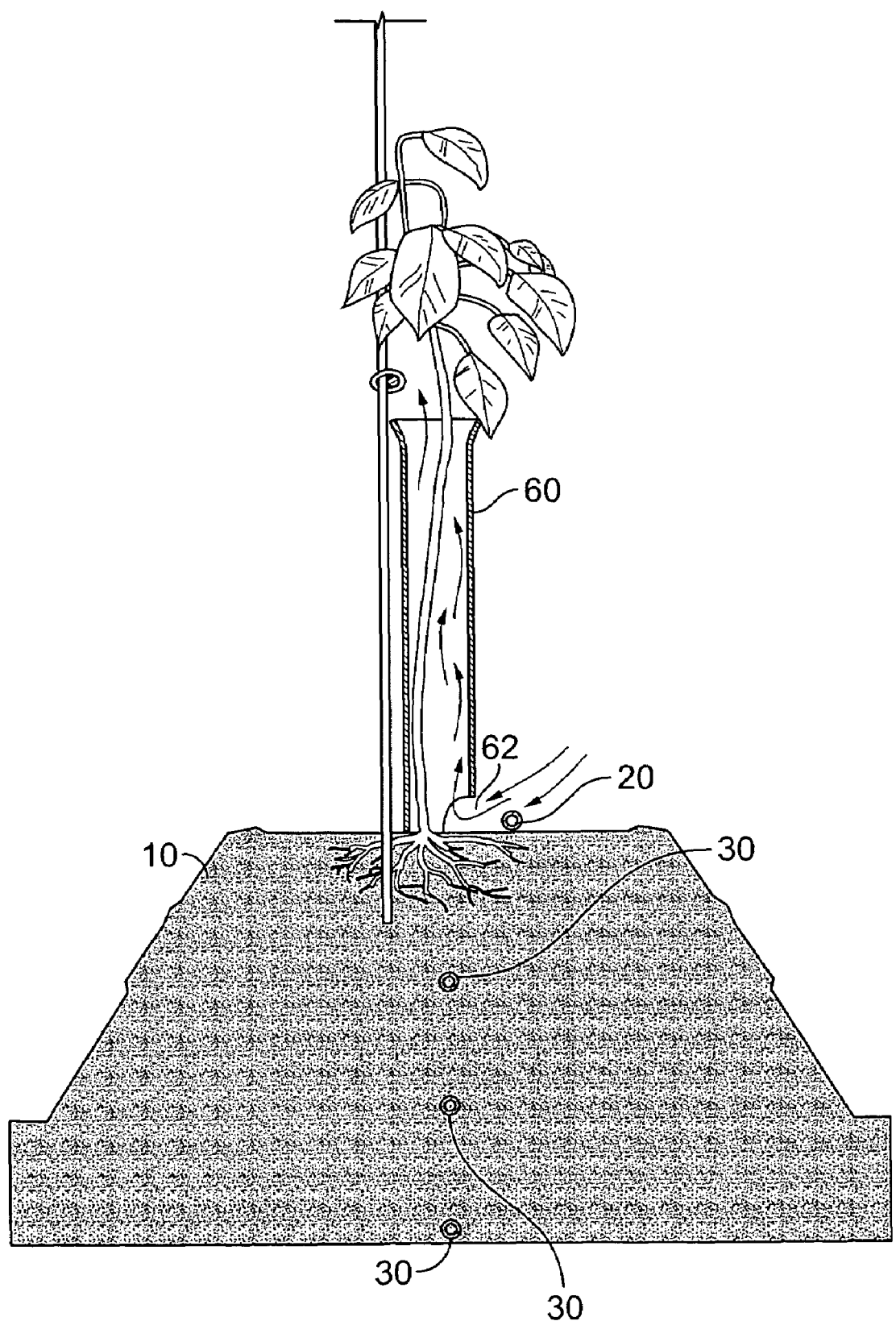
FIG. 3 is a cross-sectional view of the components shown in FIG. 2, including a cross-sectional view of the berm and underlying ground.

As is obvious to a person skilled in the art, this technique may also be used with single plants planted individually instead of in a row. In that instance the berm 10 is better defined as a mound of raised soil. FIG. 3 depicts the preferred cross-sectional shape of either a mound or berm 10.

Another component of the present invention is the use of confined irrigation and fertigation. The confined irrigation and fertigation system comprises the use of standard industry plastic feeder conduit 20 that lies directly on the ground along a row of plants. However, the feeder conduit 20 may be any kind of liquid delivery conduit such as pipes, tubes or hoses made from a variety of materials.

Figure 2:
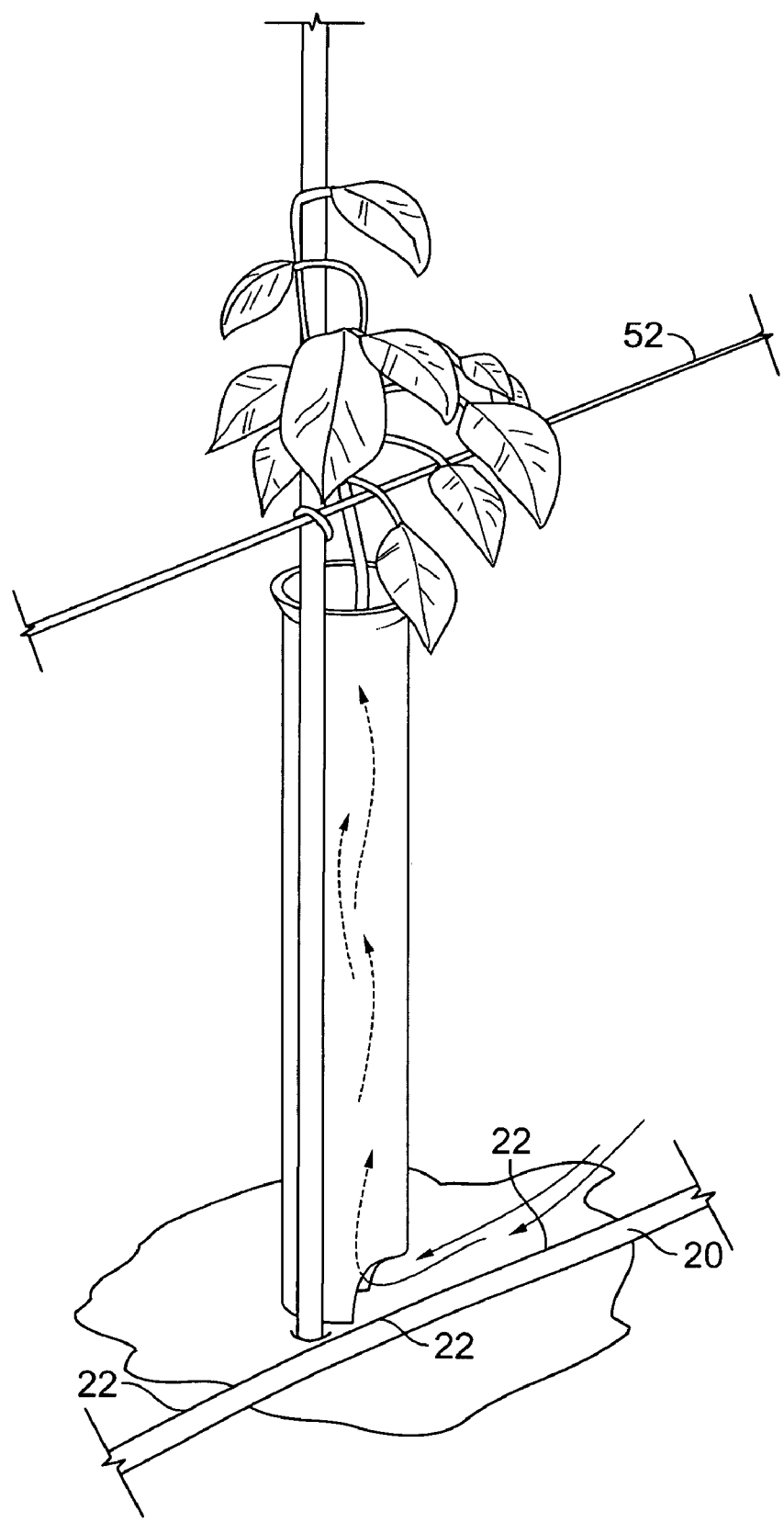
FIG. 2 is a more detailed view of a preferred embodiment of the components used in accordance with the present invention.

As shown in FIGS. 1-3, a drip system includes emitters 22 disposed along the conduit 20 through which liquid may be dispensed. Preferably a drip emitter 22 is located at the base of a plant and a drip emitter 22 is located to each side of the plant. For example, for use with fruit trees, an emitter 22 would be placed at the base of the tree and approximately one foot to either side. The emitter 22 may simply be a small hole or a drip emitter in the conduit 20 through which liquid may slowly escape.

Figure 4:
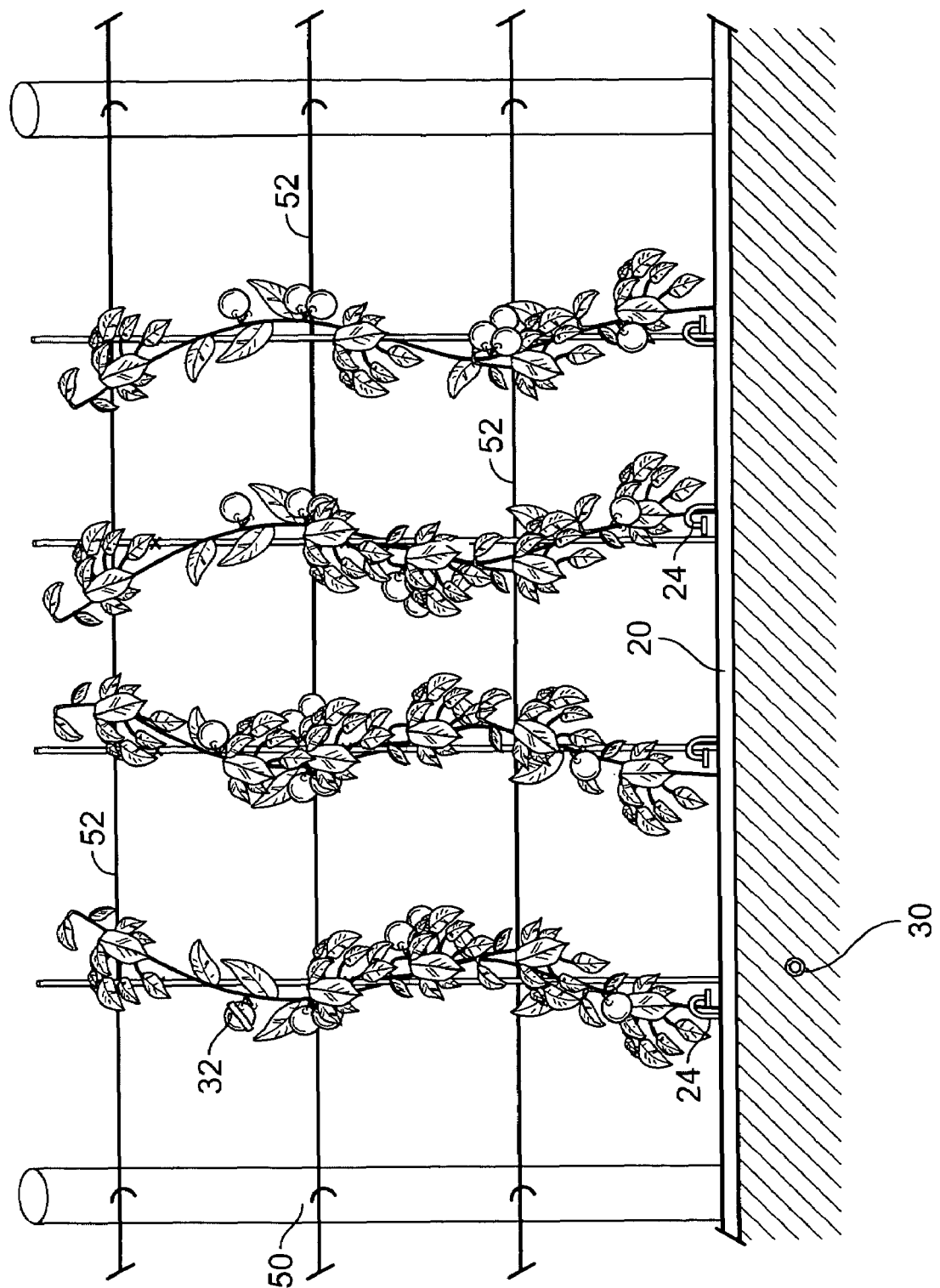
FIG. 4 is a side view of a row of mature fruit trees bearing fruit.

Alternatively, the confined irrigation and fertigation system may include micro-spray emitters 24, as shown in FIG. 4. The micro-spray emitters 24 confine the amount of sprayed liquid to only the area adjacent each plant, to limit waste and the amount of irrigation that is needed for the plants.

The exact frequency and duration of watering depends on the plant type, the age of the plant, the season of the year, and the evapotranspiration rate. For example, for use with trees, watering may occur every two to three days for up to two hours at a time for a young tree. By the time a tree has reached several years in age watering may occur multiple times in an hour, for up to 10 minutes at a time. The use of field sensors, which will be further discussed later, may be used to determine the amount of watering that is needed.

The specific performance characteristics of the emitters 22, 24, and their exact spacing on the ground is not critical to the ultimate distribution of water and fertilizer (discussed in greater detail later) by the confined irrigation and fertigation system. It is the purpose of the confined irrigation and fertigation system to apply water and fertilizer only where it is needed, thus reducing the consumption and cost of water and fertilizer. When the confined irrigation and fertigation system is used in conjunction with the previously described berm component, the feeder conduit 20 is run along the entire length of the berm 10. Keeping feeder roots within the berm results in root growth in a warmer nematode free environment. The emergence of buds, shoots and leaves, and flowers takes place in the spring, and keeping the roots in the warm berm environment facilitates improved growth. The confined irrigation and fertigation system ensures that water and fertilizer is applied only along the length of the berm, and preferably to a depth not exceeding the height of the berm, so that the feeder roots stay within the berm soil zone.

Besides reducing water and fertilizer consumption, another benefit of the confined irrigation and fertigation system is the reduction of unwanted weeds between the cultivated plants. Weeds pull moisture and nutrients from the soil, away from the cultivated plants.

Another component of the present invention is the use of electronic sensors. The sensors include sub-soil sensors (e.g. tensiometers) 30 and plant sensors 32 located on the plants themselves.

The amount of water that needs to be applied to the plants may be determined by the sub-soil sensors 30 buried below the plants. If used with the enhanced berm 10, the sub-soil sensors 30 placed at several representative locations within a field are used to gauge the degree of soil moisture or saturation at each of these depths. The objective is to maintain well-watered plants, and if used with an enhanced berm 10, to maintain the feeder roots within the berm 10 for optimal growth. Sub-soil sensors located below the berm 10 can signal the introduction of moisture at that location, and prevent unnecessary overwatering.

Additional plant sensors 32 may be applied to the fruit, stems and leaves of plants to monitor the physiological changes in the plant and also gauge the amount to water the plants. One of the physiological roles of fruit is as a reservoir for water. Immediately after watering, the fruit swells to its greatest size, but as the plant loses water through transpiration the fruit decreases in size. The plant sensor 32 provides direct feedback on these changes and may be used to determine an optimum watering pattern. Similar plant sensors 32 may also record equivalent responses in stem and leaf changes, as well as temperature changes on leaves. The plant sensors 32 may also take air temperature and humidity readings if desired.

Inputs from the sub-soil water sensors 30 and plant sensors 32 may be used to provide signals to a watering control system (not shown) that determines and automatically executes an optimum watering pattern depending on soil and plant condition feedback from the sensors 30, 32.

Figure 5:
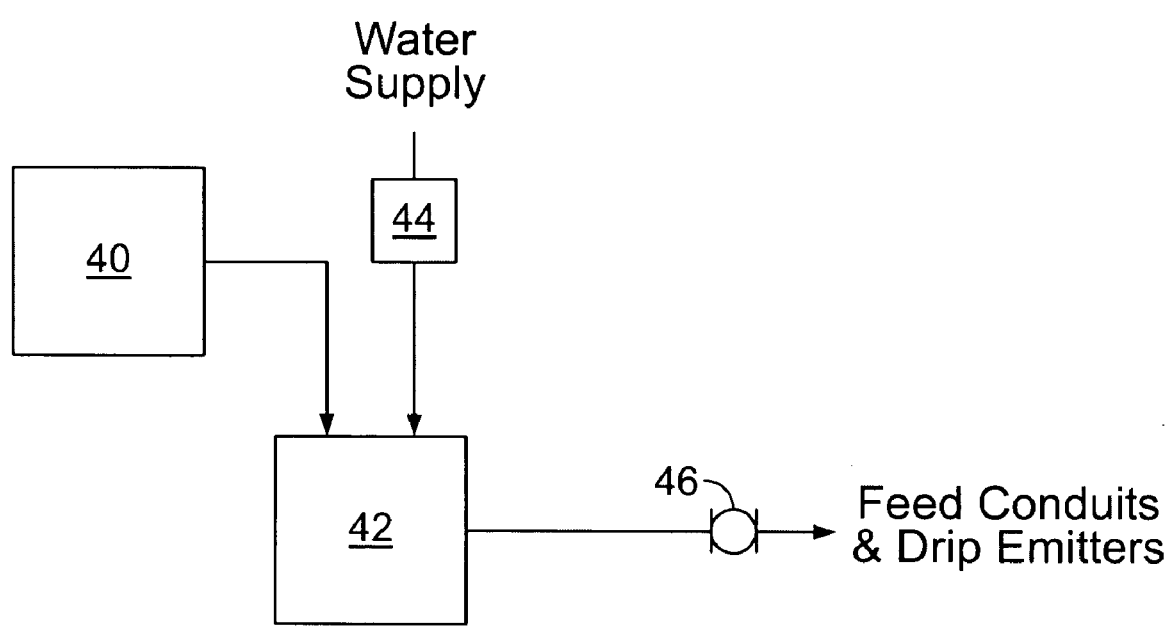
FIG. 5 shows a diagram depicting a process for mixing additives into irrigation water.

Referring now to FIGS. 4 and 5, fertilizers may also be directly incorporated in the water in the confined irrigation and fertigation system. This is known as the fertigation component of the present invention. In a simple embodiment, feed tank 40 supplies fertilizer and nutrients to a mixing tank 42 in which the fertilizer is mixed with water from a water supply. Water for the fertigation system is first run through a filter 44 to remove the particulates that may clog the drip emitters or spray system. The resulting mixture is provided at a desired concentration through a pump 46, and supplied for distribution to the plants to the feed conduits 20 and emitters 22, 24. A fertigation control unit (not shown) may be used to control the supply of fertilizers and nutrients from various feed tanks to various mixing tanks to provide various solutions of feed formulas. The fertigation control unit, possibly in conjunction with the watering control system, may electronically control flow valves linked by computer to continuous in-line meters that measure the levels of the additives in the water. Thus, the main water feed to the drip irrigation system is provided with the desired levels of fertilizers and nutrients needed by the plants as regulated by the fertigation control unit. The specifics of added fertilizer and nutrients, as well as the frequency and duration of application, are determined by the types of individual cultivare, their age, the time of the year, and plant growth and development stages.

A further benefit is that the confined irrigation/fertigation system, by continually providing the optimum nutrients to a plant throughout its life, results in fruits, nuts or other plant material harvested for consumption with increased nutrients. Thus the fruit, nut or other plant material is also of a better quality from a nutritional standpoint.

The use of each of the above components in the cultivation system of the present invention has resulted in the rapid but stunted growth of various plants. By confining the feeder roots of a plant, the intrinsic root/shoot ratio for each plant forces the plant to limit its growth above the ground. This stunts the growth of plant once it reaches a certain size. However, the confined irrigation and fertigation system also provides the optimum amount of moisture and nutrients to the plant, which promotes rapid growth. The result of this combined effort is a plant which quickly grows to a stunted size, at which point the plant is "tricked" into "believing" it has matured. For fruit and nut bearing plants this early maturation is especially beneficial because fruit or nut production also begins early. Furthermore, since the growth of the plant is stunted after a certain point, less of the plant's energy is spent on plant growth, and more is spent on fruit or nut production, which results in increased fruit or nut yields.

A consequence of early fruit or nut production is that the young plants are not yet sufficiently strong enough to bear the weight of a fruit or nut crop. Without artificial support the weight of a fruit or nut crop on a young plant literally tears the branches from the trunk of the plant. In order to overcome this problem a support system may need to be used.

Preferably the support system is a trellis system such as has been used for growing vine crops, such as grapes. The trellis has posts 50 with wires 52 strung between the posts 50 at various heights. The branches of the plants are thus supported by the suspended wires 52, and the trellis supports the weight of the fruit-laden branches instead of the trunk of the plant.

Another advantage of the support system as shown is that the outreaching branches of a plant may be manipulated to grow along the trellis. Thus, for example, the branches of a row of trees may be grown along the trellis to create a hedge. For fruit and nut bearing plants this is especially advantageous in that it provides an increased amount of sunlight along the entire row, and adjacent rows. The combination of the stunted or dwarfed plants in a hedgerow configuration allows greater sunlight to each of the plants and the ground below, allows for reduced spacing (increased number of plants per given area), and also allows for easier harvesting of a fruit or nut crop.

While the drawing figures depict the present invention as used with young citrus trees, it is understood that many plants, fruit and nut bearing or not, may benefit from this cultivation method and related components. These plants include, but are not limited to, citrus trees, deciduous trees, subtropical trees, bushes, shrubs and vines. The term fruit as used herein also is intended to include berries.

Another component of the present invention for use with young vines or trees (as shown in the figures) is a collar 60 similar to typical collars that are used to protect young plants during cold conditions. It was discovered that by slightly raising those collars to provide a space between the collar and the ground, and also using a collar with a wider diameter, beneficial cooling of the plant could be achieved during the summer, opposite from the overheating problem previously experienced with traditional coverings. Such collars are critical for plants such as citrus, which lack a protective waxy cuticle layer on the trunk in their first year after transplant. Other plants, such as many deciduous trees, have a sufficiently protected trunk at the time of transplant so that collars may not be necessary.

The collars of the present invention are of larger diameter than typical coverings to provide an air space between the plant and the inner surface of the collar 60. It is preferred to have approximately 1½ inches of air space between the plant and the inner surface of the collar 60. The bottom of the collar is then slightly elevated above the ground to allow air to flow therein. Trees are typically planted in March or April, and the collars remain in place form then until approximately May of the following year (approximately 14 months). By keeping the covering over the plant through the first full winter in the ground, there is an extra measure of protection afforded to the plants during winter.

In the summer, the elevated collar acts as a chimney allowing heated air within the collar to rise and be replaced by cool air near the ground. Air near the ground is cooled by the ground and moisture evaporating from the ground, resulting in a temperature within the collar 60 that is 3 to 8° F. cooler than the air outside the collar. Moisture evaporating from the ground and transpired from the trunk maintains the humidity level within the collar at approximately 60-80% throughout the day, which can be 2-3 times greater than the air outside the collar 60. These cooler temperatures and raised humidity reduces transpiration in the trunk of the plant, reduces the heat stress, and promotes the growth of the plant.

A drawback to the cooler more humid environment within the collar is that it may attract ants. This is easily remedied by the application of a baited pesticide at the base of the collar 60.

The collar 60 may be elevated in any number of ways to provide an opening 62 at the base of the collar. In a preferred embodiment of the collar 60, shown in FIGS. 1-3, approximately half of the base of the collar is removed to provide the opening 62.

Figure 6:
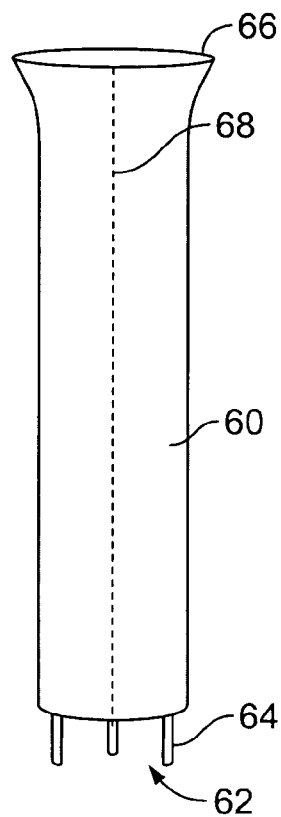
FIG. 6 shows a side view of an alternative embodiment of a plant collar.

In another embodiment shown in FIG. 6, spikes 64 are provided at the base of the collar 60 to provide openings 62.

The collar 60 also provides some wintertime benefit to the plant, even with the opening(s) 62 exposed. To provide an even greater winter benefit the opening(s) 62 may be covered, or in the embodiment shown in FIG. 6 the collar 60 may be depressed so that the spikes 64 are inserted into the ground and the openings 62 thus covered.

The collar 60 may be made of any number of suitable materials. The collar 60 may also have double walls (not shown) in which air between the walls serves to better insulate the collar providing a better cooling effect in summer or warming effect in winter. A perforated line 68 may also be provided in the collar 60 to better facilitate splitting and removal of the collar 60. Once the collar 60 is split it may be reused, if desired, by reapplying the collar around a plant and fastening the split if necessary. The collar may be translucent or completely opaque. Some translucency is preferred.

Another embodiment of the collar 60 may utilize a biodegradable material, such as a polypropylene material. The polypropylene is chemically unreactive and is biologically inert. The polypropylene will photo-degrade naturally over time and disintegrate into small piece easily incorporated into the soil.

The upper lip 66 of the collar 60 is preferably flared to prevent damage to the plants.

Figure 7:
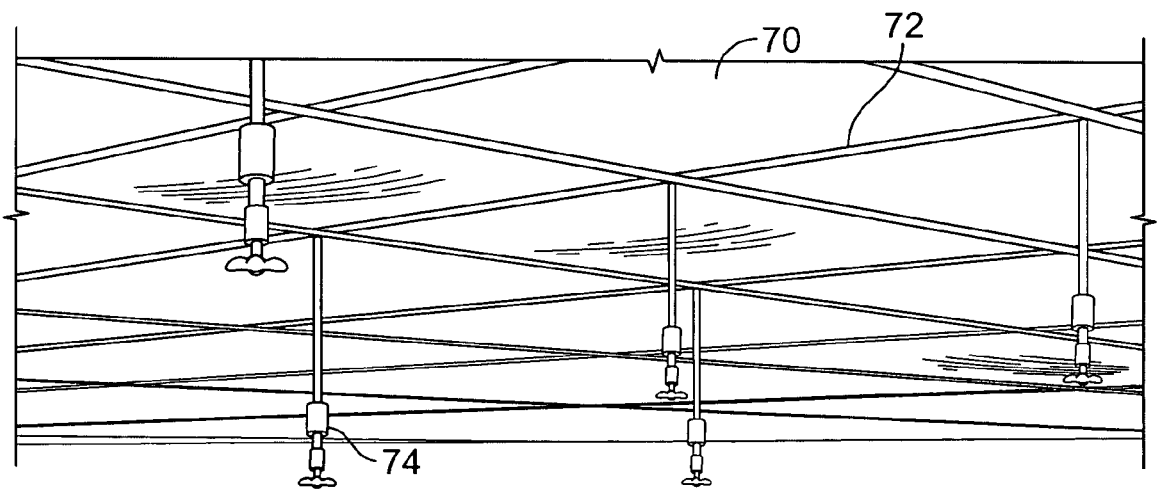
FIG. 7 shows a partial perspective view of an overcovering structure.

Another possible component is shown in FIG. 7 is an overcovering structure. An embodiment of the overcovering structure includes netting 70 that is supported above the plants. The netting 70 is supported by cables 72 strung over vertically extending posts (not shown) or some other structure. Misters 74 are also preferably provided and allow a protective spray of water to be used in hot or cold conditions, if necessary.

The netting 70 provides a number of advantages. The netting 70 may be used to partially block the amount of sunlight reaching the plants. In some environments, and for some plants, too much sunlight can stress a plant. Too much sunlight heats the plant, may "sunburn" the plant, and causes excessive transpiration of the plant and soil evaporation, which dehydrates the plant.

The netting 70 also provides a space thereunder which can more easily be manipulated when adverse climatic conditions occur. If overly hot conditions occur, the misters 74 may be used to cool the space under the netting. The misters 74 also increase humidity within the space to a limited extent depending on the porosity of the netting and outside wind conditions. In overly cold conditions the misters 74 similarly may be used to protect against frost or freeze damage. The netting 70 also provides some insulating effect, trapping the heat radiated from the soil or preventing warm outside air from mixing with cooled air inside the structure.

The netting 70 also protects the plants from adverse weather related conditions. Wind, hail and heavy rain can deflower a plant. Wind can also cause damage to the branches and leaves of a plant, and blemishes on fruit caused by wind-driven impacts and abrasion. Wind may also deposit dust on the leaves of the plants. A dust layer reduces the ability of the leaves to absorb solar energy. The netting 70 substantially prevents the formation of a dust layer. The netting 70 may also extend downward to the ground, forming walls, completely enclosing a given area.

The netting 70 also reduces the infestation of pests such as flying insects and birds.

Another overcovering structure that is well known and thus not shown in the drawing figures, and which may be necessary in certain climates, is a greenhouse.

As can be seen from the above description, the method and components of the present application provides substantial benefits. With respect to the plants themselves, the benefits include increased growth rate, early maturation, early and increased yield of fruit, nuts and harvested plant material, easier harvesting, less stress on the plants, increased quality of fruit, nut and plant material, and increased numbers of plants that can be grown in a given area. With respect to economic benefits, there is savings in labor, savings in water, fertilizer, herbicides and pesticides, and increased plant productivity and overall profit. With regard to environmental benefits, water and fertilizer resources are saved, the use of environmentally harmful chemicals is reduced, run-off into water sources is reduced, erosion is reduced, and the amount of land tied up in agriculture is reduced.

While the invention has been described with reference to specific embodiments, it will be apparent that numerous variations, modifications and alternative embodiments of the invention are possible, and accordingly all such variations, modifications and alternative embodiments are to be regarded as being within the scope and spirit of the present invention as claimed.

What is claimed is:

1. A method of cultivating plant material comprising the steps of:
   providing a mound of raised soil with a sufficient soil volume to a plant to develop roots primarily in the mound;
   restricting irrigation and fertigation of water, nutrients and fertilizers to a top zone within the mound to encourage feeding roots to grow mostly at a shallow depth wherein an intrinsic root/shoot ratio of the plant limits the growth of the plant above the mound which results in stunting the growth of the plant; and
   supplying an amount of moisture and nutrients to the plant to substantially promote rapid but stunted growth of the plant, whereby the plant matures into a dwarfed plant.

2. The method of claim 1 further comprising the step of monitoring moisture levels below the plant with a sub-soil sensor.

3. The method of claim 2 wherein the sub-soil sensor is selected from the group consisting of a tensiometer and an electronic soil moisture sensor.

4. The method of claim 1 further comprising controlling the restricting irrigation and fertigation step with a computer system.

5. The method of claim 2 further comprising controlling the restricting irrigation and fertigation step with a computer system using feedback from the monitoring moisture levels measured by the sub-soil sensor.

6. The method of claim 1 further comprising minimizing any additional stress imposed upon the plant.

7. The method of claim 1 further comprising mounting an above ground sensor on or near the plant.

8. The method of claim 7 wherein the above ground sensor provides temperature and humidity readings.

9. The method of claim 1 further comprising supporting physically the plant with a plant support system.

10. The method of claim 1 further comprising protecting the plant with an overcovering structure.

11. The method of claim 10 further comprising spraying water onto the plant with a water spraying mister attached to the overcovering structure.

12. The method of claim 1 wherein the plant grown by said method generally produces fruit or nuts relatively earlier in the plant's lifetime in comparison to a comparable plant grown by any other known method.

13. The method of claim 1 wherein most of the feeder roots are being confined to occur in the too 12-18 inches of the top of the mound.

14. The method of claim 1 wherein a frequency and duration of the restricting irrigation and fertigation step functionally depends upon parameters selected from the group consisting of a plant type, an age of the plant, a season of the year, an evapotranspiration rate and water useage information.

15. The method of claim 1 wherein resultant fruit, nut or other plant materials harvested from the plant grown by said method is a generally better nutritional quality relative to a comparable plant grown by any other known method.

16. The method of claim 15 wherein resultant fruit is selected from the group consisting of citrus fruit, grapes, and berries.

17. The method of claim 1 wherein harvest of resultant fruit, nut or other plant material from the plant grown by said method is of a generally better yield relative to a comparable plant grown by any other known method.

18. The method of claim 1 wherein the feeding roots grow in a shallow death in the mound where a population density of harmful nematodes is reduced due to solar heat buildup in the mound.

19. The method of claim 9 wherein the plant support system comprises a trellis.

20. The method of claim 9 wherein the plant support system comprises a post.

21. The method of claim 1 wherein the plant is selected from the group consisting of citrus trees, deciduous tree, subtropical trees, berry bushes, shrubs and vines.

22. The method of claim 1 further comprising minimizing any additional stress to the plant.

23. The method of claim 22 wherein the minimizing an additional stress is selected from the group consisting of minimizing moisture stress, minimizing temperature stress, minimizing sunlight stress, minimizing strain by physically supporting the plant and minimizing harvesting stress.

24. The method of claim 1 further comprising increasing a number of plants per unit area above a density greater than a concentration of plants per unit area grown in another agricultural technique.

25. The method of claim 1 wherein the mound is a berm having a substantially flat top surface.

26. The method of claim 1 wherein a plurality of plants is arranged along a substantially linear row on the mound.

27. The method of claim 1 wherein the restricting irrigation and fertigation step is performed at a predetermined schedule.

28. The method of method 1 wherein the restricting irrigation and fertigation step performed with an irrigation conduit.

29. The method of claim 28 wherein the irrigation conduit having a plurality of liquid emitters is arranged lengthwise along the conduit.

30. The method of claim 1 wherein the restricting irrigation and fertigation step encourages feeding roots to grow mostly in a relatively close proximity to a trunk of the plant.

31. A method of cultivating plant material comprising the steps of:

providing a mound of raised soil with a sufficient soil volume for a plant to develop roots primarily in the mound;

restricting irrigation and fertigation of water, nutrients and fertilizers to a top zone within the mound to encourage feeding roots to grow mostly at a shallow death wherein an intrinsic root/shoot ratio of the plant limits the growth of the plant above the mound which results in stunting the growth of the plant;

supplying an amount of moisture and nutrients to the plant to substantially promote rapid but stunted growth of the plant, whereby the plant matures into a dwarfed plant;

monitoring moisture levels below the plant with a sub-soil sensor;

mounting an above ground sensor on or near the plant;

controlling the restricting irrigation and fertigation step with a computer system using feedback from the monitoring moisture levels measured by the sub-soil sensor and using feedback from the above ground sensor;

supporting the plant with a plant support system; and minimizing any additional stress imposed upon the plant.

\* \* \* \* \*